United States Patent [19]

Biegen

[11] Patent Number: 4,948,253

[45] Date of Patent: Aug. 14, 1990

[54] INTERFEROMETRIC SURFACE PROFILER FOR SPHERICAL SURFACES

[75] Inventor: James F. Biegen, Middletown, Conn.

[73] Assignee: Zygo Corporation, Middlefield, Conn.

[21] Appl. No.: 264,262

[22] Filed: Oct. 28, 1988

[51] Int. Cl.⁵ .............................. G01B 9/02
[52] U.S. Cl. .................... 356/351; 356/360
[58] Field of Search .............. 356/351, 359, 360

[56] References Cited

U.S. PATENT DOCUMENTS

4,696,572  9/1987  Ouo .......................... 356/360 X
4,820,049  4/1989  Biegen ......................... 356/360

Primary Examiner—Davis L. Willis
Assistant Examiner—Matthew W. Karen
Attorney, Agent, or Firm—Bryan, Cave, McPheeters & McRoberts

[57] ABSTRACT

An interferometric profiler for measuring the topography of a spherical test surface (48), comprises a linearly polarized light source (10), a rotating diffuser disc (18, 20); an optical system (26, 30, 31) for collecting and directing light from the extended light source; a first quarter-wave phase retardation plate (38); a lens (34) for focusing the resultant circularly polarized light beam onto a spherical test surface (48 and a spherical reference surface (45), the surface (45) having a reflective coating (46) and an anti-reflection coating; a piezoelectric transducer (80) for varying the relative distance between the spherical test surface (48) and the spherical reference surface (45); means for recombining the test and reference wavefronts (53T,53R) to produce an interference pattern (74); a lens (65) for imaging the spherical test surface (48) and the spherical reference surface (45) onto the photosensitive elements (58) of an imaging device (56); means for optically isolating the imaged spherical test surface (48) and the spherical reference surface (45) and the interference pattern (74); means (38) for converting the test wavefront (53T) and reference wavefront (53R) into a third linearly polarized light beam which has its polarization vector rotated 90 degrees relative to the first linearly polarized light beam; the polarizing beamsplitter (30, 31) directing the third linearly polarized light beam to the imaging device (56); the imaging device (56) sensing the interference pattern (74), a CCTV monitor (72) for viewing the imaged spherical test surface (48) and the spherical reference surface (45) and the interference pattern (74); and means (76) for processing the output of the imaging device (56) to profile the topography of the test surface (48).

36 Claims, 2 Drawing Sheets

INTERFEROMETRIC SURFACE PROFILER FOR SPHERICAL SURFACES

CROSS-REFERENCE TO RELATED APPLICATIONS

This application is related to my commonly owned U.S. Pat. No. 4,732,483, entitled "Interferometric Surface Profiler", issued Mar. 22, 1988, my commonly owned co-pending U.S. Patent Applications entitled "Coating and Method for Testing Plano and Spherical Wavefront Producing Optical Systems Having a Broad Range of Reflectivities", bearing Serial No. 109,715, filed Oct. 16, 1987, now Pat. No. 4,820,049, and "Laser Equal Path Interferometric Surface Profiler" bearing U.S. Serial No. 07/185,075, filed Apr. 22, 1988, now Pat. No. 4,869,593, the contents of all of which are specifically incorporated by reference herein in their entirety, and is an improvement thereon.

BACKGROUND OF INVENTION

1. Field of the Invention:

The present invention relates to apparatus for the noncontact measurement of the surface profile of a steeply spherical surface at low magnification ( 10X). More particularly, the invention relates to optical apparatus which is useful for the high accuracy measurement of surface roughness of a steep spherical surface or of the deviation from sphericity of a steeply spherical surface.

2. The Prior Art

Prior art techniques available for measuring, with high precision, the surface of a steeply spherical surface include mechanical and optical profilers. A commonly used contacting apparatus used to measure surface profiles is a stylus instrument, e.g., the commercially available Talysurf or the Talystep. However, in the case of a soft or delicate surface, the stylus digs into the surface and measurement results do not truly represent the surface. Other limitations of the stylus technique include its high sensitivity to microphonics and vibrations, the delicate nature of the stylus and the mechanism, and the need for a highly skilled operator to align and use it.

Prior art optical profilers have been based on a variety of techniques, e.g., scanning fringes of equal chromatic order (FECO) interferometry, see for example, J.M. Bennett, "Measurement of the RMS Roughness, Autocovariance Function and Other Statistical Properties of Optical Surfaces using a FECO Scanning Interferometer," Applied Optics, Vol. 15, pp. 2705-2721 (1976); scanning Fizeau interferometry, see for example J.M. Eastman and P.W. Baumeister, "Measurement of the Microtopography of Optical Surfaces using a Scanning Fizeau Interferometer," J. Opt. Soc. Am., Vol. 64, p. 1369(A) (1974); optical heterodyne interferometry, see for example, G.E. Sommargren, "Optical Heterodyne Profilometry," Applied Optics, Vol. 20, pp 610-618 (1981); a Mirau interferometer, see for example, B. Bhushan, J.C. Wyant, and C.L. Koliopoulis, "Measurement of Surface Topography of Magnetic Tapes by Mirau Interferometry," Applied Optics, Vol. 24, pp. 1489-1497 (1985) and J.C. Wyant and K.N. Prettyjohns, U.S. Pat. No. 4,639,139, issued Jan. 27, 1987; a Nomarski-based instrument, see for example S.N. Jabr, "Surface-roughness Measurement by Digital Processing of Nomarski phase contrast Images," Optics Letters, Vol. 10, pp. 526-528 (1985); a birefringent microscope, see for example, M.J. Downs, U.S. Pat. No. 4,534,649, issued Aug. 13, 1985; and shearing interference microscopy, see for example, M. Adachi and K. Yasaka, "Roughness measurement using a shearing interference microscope," Applied Optics, Vol. 25, pp. 764-768 (1986).

FECO interferometry requires that the test surface be brought very close to the reference surface, e.g., typically within about several micrometers, thereby frequently causing the test surface to be damaged by residual dust particles. Also, FECO interferometry does not lend itself easily to the measurement of spherical surfaces.

The optical heterodyne interferometer, which is both common path and does not require a reference surface, produces very accurate and precise measurements. While this technique provides state-of-the-art optical measurements, it suffers from a number of limitations. In particular, the apparatus is complex and expensive. In addition, since the technique only scans in a circle of fixed radius, it does not profile an area of the test surface. Finally, the out of plane measurement capability is severely restricted to a quarter of the illumination wavelength so that only planar or near planar surfaces can be measured.

The conventional white light or filtered white light Mirau type two-beam interferometer microscope suffers from several serious limitations. The conventional Mirau obscuring reference surface precludes using the interferometer technique with low power objective magnifications whether the reference surface is spherical or planar. Because of the obscuring reference surface an incoherent illumination source must be used which severly limits the usable depth of focus of the objective to the coherence length of the illumination source, see J.F. Biegen, U.S. Pat. No. 4,732,483, issued Mar. 22, 1987. Also, the vertical alignment tolerance needed for fringe acquisition is on the order of a few mirometers.

Other two-beam, equal path interferometer microscopes such as the Michelson and Linnik are adaptable to utilizing spherical reference surfaces for low magnification objectives. The disadvantage of the Michelson is the serious reduction of the objective working distance which results from the necessary positioning of a beamsplitter cube to the front of the objective. The Linnik interferometer technique of using two objectives is both expensive and difficult to align. The Michelson and Linnik, when used with the extended incoherent illumination source, suffer the same tight vertical alignment tolerance as does the Mirau interferometer microscope.

The birefringent microscope technique is both common path and does not require a reference surface. However, it does have some severe limitations. First, it only scans a line so that it does not profile an area of the test surface. Second, it is limited in its ability to use a sufficiently large diameter for the reference beam on the test surface, thereby limiting the extent to which lower spatial frequencies, such as spherical test surfaces, can be measured.

In the present invention, high precision profile measurements can be made of spherical test surfaces using low power objectives ( 10X) with a Mirau type two-beam microscope interferometer. The interference of the two-beam microscope interferometer is localized within the full depth of focus of every objective magnification permitting a large vertical alignment tolerance. A large range of test surface curvatures from plano to steeply spherical can be measured relative to the prior art. The improvements of the present invention, thusly, overcome the disadvantages of the prior art and allow the high accuracy, fine lateral resolution measurement of spherical surface microroughness profiles and deviations from sphericity.

SUMMARY OF THE INVENTION

In accordance with an embodiment of the instant invention, I provide an interferometric profiler capable of measuring accurately the topography of a spherical test surface, comprising (1) a light source which can be either spatially coherent or incoherent of either temporally coherent or incoherent electromagnetic radiation, most preferably a linearly polarized laser; (2) mean, most preferably a rotating diffuser disc, onto which light from said linearly polarized light source impinges to form a linearly polarized second light source having, most preferably, greatly reduced spatial coherence while retaining high temporal coherence; (3) an optical system comprising a first lens and beamsplitter, most preferably a polarizing beamsplitter, to collect and direct, preferably without significant light loss, a first linearly polarized light beam produced from the light from said extended second light source; (4) a first quarter-wave phase retardation plate which converts said first linearly polarized light beam into a circularly polarized light beam; (5) a second lens for focusing said circularly polarized light beam onto a spherical test surface and a spherical reference surface of an interferometer; (6) a coating on said spherical reference surface which is, most preferably, a metallic or semi-metallic coating on said spherical reference surface and an antireflection coating on said metallic or semi-metallic coating to form an unobscuring reference surface for said spherical reference surface; (7) a reference arm of said interferometer within which is located said spherical reference surface and a second quarter-wave phase retardation plate which converts said circularly polarized light beam into a second linearly polarized light beam; (8) a test arm of said interferometer within which is located said spherical test surface and a third quarter-wave phase retardation plate on which is located a beamsplitter surface, that divides said second linearly polarized light beam into test wavefronts and reference wavefronts and directs said test wavefronts and reference wavefronts onto said spherical test surface and said spherical reference surface, respectively; (9) means, most preferably a piezoelectric transducer, for varying the relative distance between said spherical test surface and said spherical reference surface; (10) means, most preferably, said beamsplitter surface for recombining said test wavefronts and reference wavefronts after they have interacted separately with said spherical test surface and said spherical reference surface to produce an interference pattern; (11) means, said second lens, for imaging said spherical test surface and said spherical reference surface onto the photosensitive elements of an imaging device, most preferably a solid-state array camera; (12) means, said first quarter-wave phase retardation plate, said second quarter-wave phase retardation plate, said third quarter-wave phase retardation plate, and said polarizing beamsplitter, which optically isolate said imaged spherical test surface and said spherical reference surface and said interference pattern; (13) means, said first quarter-wave phase retardation plate, for converting said test wavefronts and reference wavefronts into a third linearly polarized light beam which has its polarization vector rotated 90 degrees relative to said first linearly polarized light beam; (14) means, said polarizing beamsplitter, which direct said third linearly polarized light beam, prefereably without significant light loss, to said imaging device (15) means, said imaging device, for sensing said interference pattern; (16) means, most preferably a CCTV monitor, for viewing said imaged spherical test surface and said spherical reference surface and said interference pattern; (17) means for processing the output of said imaging device to profile the topography of said test surface.

DETAILED DESCRIPTION OF THE INVENTION

Figure 1:
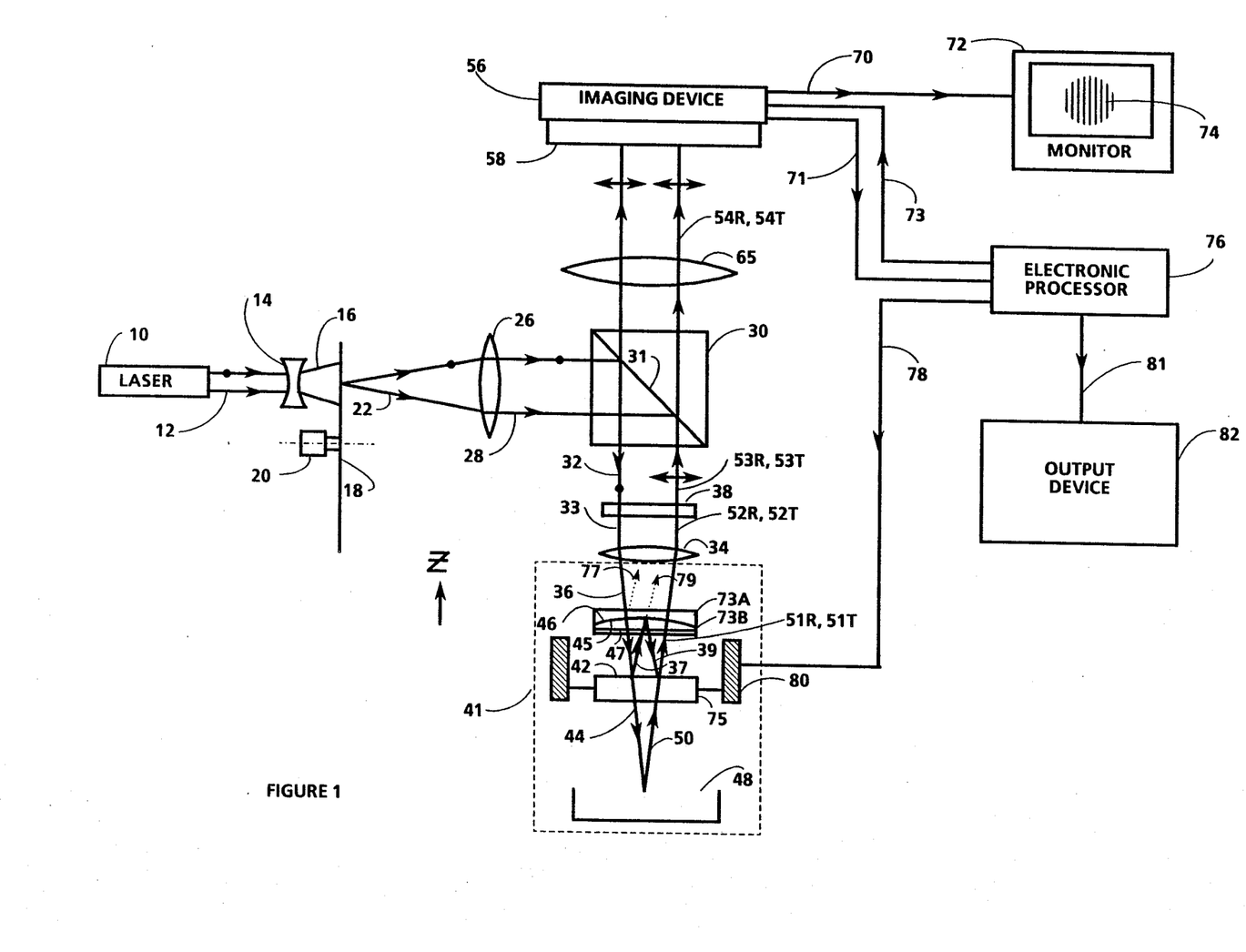
FIG. 1 depicts, in schematic form, one embodiment of the einstant invention.

FIG. 1 depicts, in schematic form, one embodiment of the instant invention for providing noncontact measurement of the profile of a surface. While the apparatus of the present invention has application for a wide range of spatially and temporally coherent radiation sources, the following description is taken by way of example, with respect to an optical measuring system, such as one employing a linearly polarized laser (10), that emits a nearly collimated single frequency beam (12) which is linearly polarized perpendicular to the plane of FIG. 1 as indicated by the dot. Lens (14) transforms beam (12) into a spherically diverging wavefront (16) which impinges onto a diffuser disc (18) to produce wavefronts (22) which are scattered from the diffuser disc (18). Diffuser disc (18) is rotated by a motor (20) to greatly reduce the spatial coherence of the spherically diverging wavefronts (22) to render the spherically diverging wavefronts (22) spatially incoherent. Means other than a rotating diffuser disc (18) can be used to reduce the spatial coherence. Alternatively, it can be a non-moving liquid crystal of the dynamic scattering type of a liquid or solid acousto-optic modulating cell. Lens (26) transforms spherically diverging wavefronts (22) into collimated wavefronts (28) which are totally reflected by the polarizing beamsplitter diagonal surface (31) of the polarizing beamsplitter (30), to become collimated wavefronts (32). The collimated wavefronts (32) first pass through a quarter-wave phase retardation plate (38), converting the linearly polarized light into circularly polarized light and are then directed through objective lens (34) to become converging wavefronts (36). Converging wavefronts (46) enter interferometer doublet plate (73), which is made up of doublet elements (73A) and (73B). Interferometer doublet plate (73) is a zero power doublet, the two doublet elements (73A) and (73B) have matched index of refractions as well as radius matched spherical interior surfaces. The spherical interior surface of doublet element (73B), the spherical reference surface (45) radius of curvature is chosen to match the expected spherical test surface (48) curvature so that a null to near null interference fringe condition will exist. The spherical reference surface (45) can be either convex or concave so that either convex or concave spherical test surfaces (48) can be measured. The converging wavefronts (36) continue and are transmitted through a reference surface coating (46) and quarter-wave retardation plate (47). The reference surface coating (46) is described in my co-pending U.S. Pat. Application entitled "Coating and Method for Testing Plano and Spherical Wavefront Producing Optical Surfaces and Systems Having a Broad Range of Reflectivites" (Serial No. 109,715, filed Jan. 4, 1988). The reference surface coating (46) extends across the full aperture of the spherical reference surface (45) such that the converging wavefronts (36) are minimally reflected from the reference surface coating (46) spherical reference surface (45) interface as represented by reflected wavefronts (77). No central obscuration is presented by the reference surface coating (46) to the converging wavefronts (36) so that low power objective lens (34) magnifications ( 10X) can now be utilized in a spherical reference surface Mirau type interferometer configuration. See my co-pending U.S Patent Application entitled "Laser Equal Path Interferometric Surface Profiler" bearing U.S. Serial No. 07/185,075, filed Apr. 22, 1988, which describes a Mirau type interferometer configuration with an unobscuring plano reference surface. The beamsplitter surface (42) reflects half of the incident beam intensity of the converging wavefronts (36) upward to become converging test wavefronts (37) which first pass through a quarter-wave phase retardation plate (47) to focus on the spherical reference surface (45). In order to maximize fringe contrast at test surface reflectivity extremes of 4% and 100%, the reference surface coating is such that about 20 % of the converging test wavefronts (37) beam intensity is reflected from the spherical reference surface (45) reference surface coating (46) to become diverging reference wavefronts (39). The remainder of the converging test wavefronts (37) beam intensity is partly absorbed and partly transmitted through the reference surface coating (46) as represented by diverging wavefronts (79). Quarter-wave phase retardation plate (47), when properly aligned to the quarter-wave phase retardation plate (38), produces a full-wave of phase retardation to diverging wavefronts (79) resulting in no net polarization rotation relative to the collimated wavefronts (32). This causes the diverging wavefronts (79) to be reflected from the polarizing beamsplitter diagonal surface (31) and return to the light source (10) rather than the photosensitive elements (58), or pixels, of an imaging device (56) which would cause a loss of fringe contrast. The portion of the incident beam intensity of the converging wavefronts (36) not reflected by the beamsplitter surface (42) is transmitted through the interferometer beamsplitter substrate (75), also a quarter-wave phase retardation plate, to become the converging test wavefronts (44) which then focus onto the spherical test surface (48). The converging test wavefronts (44) reflected from the spherical test surface (48) emerge to become diverging test wavefronts (50) which are again transmitted through interferometer beamsplitter substrate (75) and recombine and interfere with the diverging wavefronts (39) reflected from the spherical reference surface (46) at the beamsplitter surface (42) to become diverging test and reference wavefronts (51R, 51T). Diverging test and reference wavefronts (51R, 51T) are collected by objective lens (34) to become recollimated test and reference wavefronts (52R, 52T) which then pass through the quarter-wave phase retardation plate (38) becoming test and reference wavefronts (53R, 53T). A total phase retardation of one full-wave and a half is experienced by both the test and reference wavefronts (53R, 53T) so that the polarization of the test and reference wavefronts (53R, 53T) are rotated 90 degrees relative to the collimated wavefronts (32) thereby permitting total transmission through the polarizing beamsplitter (30). The test and reference wavefronts (53R, 53T) are made converging test and reference wavefronts (54R, 54T) by the imaging lens (65) which then focus onto the photosensitive elements (58), or pixels, of an imaging device (56). The converging test and reference wavefronts (54R, 54T) brought to a focus form overlaying images of the spherical test surface (48) and spherical reference surface (45) together with the interference pattern representing the relative optical path differences between the spherical test surface (48) and spherical reference surface (45).

The diverging wavefront (16) impinging onto the rotating diffuser disc (18) creates an extended, spatially incoherent illumination source that retains a high degree of temporal coherence. High temporal coherence permits interference to be localized over the entire depth of focus of every objective lens (34) magnification easing the vertical alignment tolerance to obtain fringes over prior art means of illumination. On low magnification objectives, the depth of focus is on the order of tenths of a millimeter to a millimeter. Using a prior art means of illumination consisting a filtered white light incandescent source which permits a fringe localization depth within a narrow band on the order of 3-5 microns deep can make the acquiring of fringes a tedious, time consuming process.

The spherical Mirau interferometer (41) is attached to the piezoelectric transducer (80) which varies the spacing between the spherical reference surface (45) and spherical test surface (48) by producing motion of the spherical Mirau interferometer (41) in the Z direction under the control of an electrical signal (78). The output (71) provides the photosignals from the array of pixels of imaging device (56) to the electronic processor (76) to control the imaging device (56) if needed. The electronic output (78) from electronic processor (76) is fed into the piezoelectric transducer (80) to modulate the interference pattern imaged onto the photsensitive device (58). The electronic output (78) from electronic processor (76) is fed into output device (82), e.g., CRT, printer, or a plotter, to view or record the topography of a test surface (48).

Figure 2:
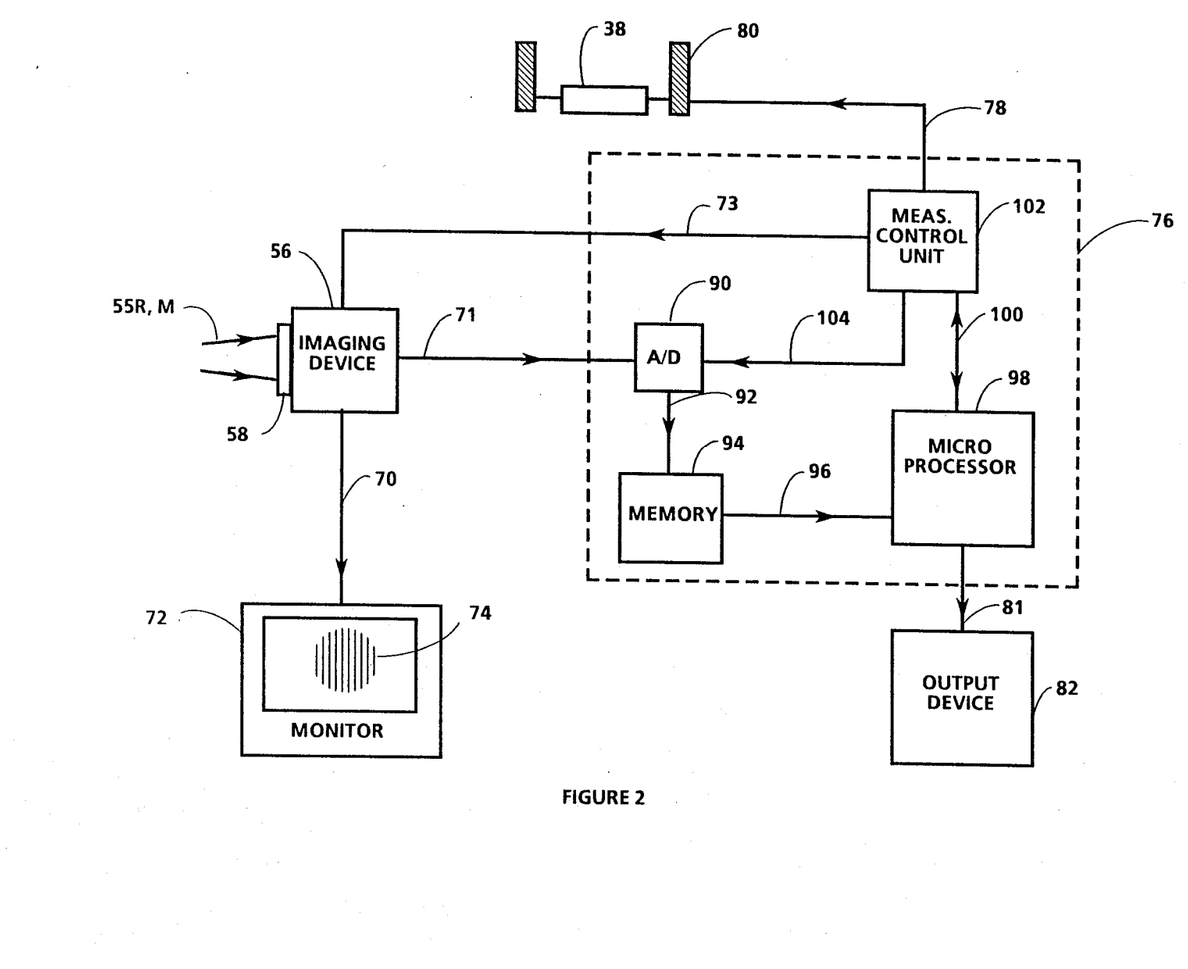
FIG. 2 depicts a schematic block diagram of the electronic processor circuitry portion of the instant invention illustrated in FIG. 1.

FIG. 2 depicts a schematic block diagram of the electronic processor circuitry (76) used in FIG. 1. The interference of wavefronts (55R) and (55T) forms an interference pattern on photosensitive elements (58) of the imaging device (56). Output (71) of the imaging device (56) is preferably fed into an analog-to-digital converter (90) to provide a digital signal (92) which is stored in memory (94), received via digital signal (96), but also provides and receives signals (100) with the measurement control unit (102) and provides an output signal (81) to the output device (82) which may be a printer, CRT, or plotter, for example. The measurement control unit (102) provides the electronic output signal (78) to the piezoelectric traNsducer (80); a clock signal (73) to the imaging device (56); and a synchronization signal (104) to the A/D converter (90).

A phase map of the interference pattern can be conventionally produced with the method described by M. Schaham, Proceedings SPIE, Vol. 306, pp. 183-191 (1981). However, the present invention is not limited to this method and can be used with a variety of phase map methods, e.g., see Gallagher, et al., U.S. Pat. No. 3,694,088, issued Sept. 26, 1972.

While the invention has been described with reference to an embodiment thereof, those skilled in the art will be able to make various modifications to the described embodiment of the invention without departing from the true spirit and scope thereof. For instance, a non-polarizing beamsplitter can be used in place of a polarizing beamsplitter with the addition of a linear polarizer positioned between the non-polarizing beamsplitter and the solid-state array. Essentially the same function can be obtained with other types of solid-state arrays. Other techniques than by using a piezoelectric transducer to vary the relative distance between the test and reference surfaces could be used for producing the constant time varying phase shift between the test wavefronts and reference wavefronts. For example, an acousto-optic Bragg cell could be utilized to provide a Doppler shift in one or both of the test wavefronts or reference wavefronts, or various rotating polarization plates could be utilized to shift the phase of one or both of the test wavefronts or reference wavefronts. A Zeeman split, or other two frequency laser, could be utilized to provide one frequency in the test arm of the interferometer and a different frequency (and phase) in the reference arm of the interferometer. In some instances, a vidicon camera could be used instead of a solid-state array. In general, a phase shifting mirror or other phase shifting means can be used in either arm or both arms of the interferometer. An eye lens can be used in place of the imaging device for qualitative viewing. The illumination can be either Kohler or critical or variations thereon.

Some of the advantages of the instant invention are the elimination of: central obscuration of the Mirau type interferometer allowing low magnification (i.e., 10X) objectives to utilize a spherical reference surface which permits the measurement of a much broader range of test surface curvatures the maximum allowable slope of a spherical test surface being limited only by the numerical aperture (NA) of the objective; localization of interference over the entire depth of focus of every objective magnification when using a temporally coherent light source, thus making the acquisition of fringes substantially easier than the prior art; and, when using an extended, spatially incoherent source, the ability to avoid the disadvantages of coherent illuminatin such as reduced lateral resolution, sensitivity to system artifacts, and entraneous, wavefront interference distorting the desired phase map.

The improvements of the present invention, thusly, overcome the disadvantages of the prior art and allow the high accuracy, fine lateral resolution measurement of spherical surface microroughness profiles and deviations from sphericity.

While a preferred embodiment of the invention has been disclosed, obviously modification can be made therein, without departing from the scope of the invention as defined in the following claims.

I claim:

1. An interferometric profiler capable of measuring accurately the topography of a spherical test surface, said profiler comprising a light source of linearly polarized electromagnetic radiation; means optically aligned with said light source and disposed so as to have light from said linearly polarized light source impinge thereon to form a linearly polarized extended second light source; an optical system comprising a first lens and a beamsplitter disposed so as to collect and direct a first linearly polarized light beam produced from light from said extended second light source; a first quarter-wave phase retardation plate disposed in the path of said first linearly polarized light beam for converting said first linearly polarized light beam into a circularly polarized light beam; a second lens disposed in the path of said circularly polarized light beam for focusing sad circularly polarized light beam onto a spherical test surface aNd a spherical reference surface of an interferometer; wherein said spherical reference surface is defined by the interior interface of a doublet lens system, the elements of said doublet having matched indices of refraction and complementary spherical radii of curvature, said doublet having zero power; said spherical reference surface having a coating thereon which forms an unobscuring reference surface for said spherical reference surface; said interferometer comprising a reference arm within which is located said spherical reference surface and a second quarter-wave phase retardation plate for converting said circularly polarized light beam into a second linearly polarized light beam, and a test arm within which is located said spherical test surface and a third quarter-wave phase retardation plate on which is located a beamsplitter surface for dividing said second linearly polarized light beam into test wavefronts and reference wavefronts and directing said test wavefronts and reference wavefronts onto said spherical test surface and said spherical reference surface, respectively; means for varying the relative distance between said spherical test surface and said spherical reference surface; means for recombining said test wavefronts and reference wavefronts after they have interacted separately with said spherical test surface and said spherical reference surface to produce an interference pattern; means for imaging said spherical test surface and said spherical reference surface onto the photosensitive elements of an imaging device; means for optically isolating said imaged spherical test surface and said spherical reference surface and said interference pattern; means for converting said test wavefronts and reference wavefronts into a third linearly polarized light beam which has its polarization vector rotated relative to said first linearly polarized light beam; means disposed in the path of said third linearly polarized light beam for directing said third linearly polarized light beam to said imaging device; means for sensing said interference pattern; means associated with said imaging device for viewing said imaged spherical test surface and said spherical reference surface and said interference pattern; and means operatively connected to said imaging device output for processing the output of said imaging device to profile the topography of said test surface.

2. An interferometric profiler in accordance with claim 1 wherein said light source comprises a linearly polarized laser.

3. An interferometric profiler in accordance with claim 1 wherein said light source is spatially coherent.

4. An interferometric profiler in accordance with claim 1 wherein said light source is spatiallY incoherent.

5. An interferometric Profiler in accordance with claim 1 wherein said light source is temporally coherent.

6. An interferometric profiler in accordance with claim 3 wherein said light source is temporally coherent.

7. An interferometric profiler in accordance with claim 1 wherein said light source is temporally incoherent.

8. An interferometric profiler in accordance with claim 1 wherein said means for forming said linearly polarized second light source comprises a rotating diffuser disc.

9. An interferometric profiler in accordance with claim 8 wherein said light source comprises a linearly polarized laser.

10. An interferometric profiler in accordance with claim 8 wherein said light source is spatially coherent 11. An interferometric profiler in accordance with claim 10 wherein said light source is temporally coherent.

12. An interferometric profiler in accordance with claim 6 wherein said linearly polarized second light source has greatly reduced spatial coherence while retaining high temporal coherence.

13. An interferometric profiler in accordance with claim 12 wherein said means for forming said linearly polarized second light source comprises a rotating diffuser disc.

14. An interferometric profiler in accordance with claim 13 wherein said light source comprises a linearly polarized laser.

15. An interferometric profiler in accordance with claim 1 wherein said optical system comprises means for collecting and directing said first linearly polarized light beam produced from said light from said extended second light source without significant light loss.

16. An interferometric profiler in accordance with claim 15 wherein said light source comprises a linearly polarized laser.

17. An interferometric profiler in accordance with claim 1 wherein said spherical reference surface coating comprises a metallic coating on said spherical reference surface and an anti-reflection coating on said metallic coating.

18. An interferometric profiler in accordance with claim 1 wherein said spherical reference surface coating comprises a semi-metallic coating on said spherical reference surface and an anti-reflection coating on said semi-metallic coating.

19. An interferometric profiler in accordance with claim 17 wherein said light source comprises a linearly polarized laser.

20. An interferometric profiler in accordance with claim 18 wherein said light source comprises a linearly polarized laser.

21. An interferometric profiler in accordance with claim 17 wherein said light source comprises a linearly polarized laser.

22. An interferometric profiler in accordance with claim 18 wherein said optical system comprises means for collecting and directing said first linearly polarized light beam produced from said light from said extended second light source without significant light loss.

23. An interferometric profiler in accordance with claim 1 wherein said means for varying the relative distance between said spherical test surface and said spherical reference surface comprises a piezoelectric transducer.

24. An interferometric profiler in accordance with claim 23 wherein said light source comprises a linearly polarized laser.

25. An interferometric profiler in accordance with claim 1 wherein said means for recombining said test wavefronts and reference wavefronts after they have intereacted separately with said spherical test surface and said spherical reference surface to produce said interference pattern comprises said beamsplitter surface.

26. An interferometric profiler in accordance with claim 1 wherein said means for imaging said spherical test surface and said spherical reference surface comprises said second lens.

27. An interferometric profiler in accordance with claim 1 wherein said optical system beamsplitter comprises a polarizing beamsplitter.

28. An interferometric profiler in accordance with claim 27 wherein said means for optically isolating said imaged spherical test surface and said spherical reference surface and said interference pattern comprises said first quarter-wave phase retardation plate, said second quarter-wave phase retardation plate, said third quarter-wave phase retardation plate and said polarizing beamsplitter.

29. An interferometric profiler in accordance with claim 1 wherein said means for converting said test wavefronts and reference wavefronts into said third linearly polarized light beam comprises means for providing said third linearly polarized light beam with a polarization vector rotated 90 degrees relative to said first linearly polarized light beam.

30. An interferometric profiler in accordance with claim 28 wherein said means for converting said test wavefronts and reference wavefronts into said third linearly polarized light beam comprises said first quarter-wave phase retardation plate.

31. An interferometric profiler in accordance with claim 1 wherein said means for converting said test wavefronts and reference wavefronts into said third linearly polarized light beam comprises said first quarter-wave phase retardation plate.

32. An interferometric profiler in accordance with claim 27 wherein said means for directing said third linearly polarized light beam to said imaging device comprises said polarizing beamsplitter.

33. An interferometric profiler in accordance with claim 32 wherein said polarizing beamsplitter comprises means for directing said third linearlY polarized light beam to said imaging device without significant light loss.

34. An interferometric profiler in accordance with claim 1 wherein said means for sensing said interference pattern comprises said imaging device.

35. An interferometrice profiler in accordance with claim 1 wherein said means for viewing said imaged spherical test surface and said spherical reference surface and said intereference pattern comprises a monitor.

36. An interferometric profiler in accordance with claim 35 wherein said monitor comprises a CCTV monitor.

* * * * *

UNITED STATES PATENT AND TRADEMARK OFFICE
CERTIFICATE OF CORRECTION

PATENT NO. : 4,948,253                         Page 1 of 3

DATED      : August 14, 1990

INVENTOR(S) : JAMES F. BIEGEN

It is certified that error appears in the above-identified patent and that said Letters Patent is hereby corrected as shown below:

On the title page;
Abstract (right), line 1:  change "(48and" to --(48) and--.

Column 1, line 30:  After "surface.", move "2. The Prior Art" to a new line by itself and after "Art", and a colon(:).

Column 1, line 51:  After "example", add a comma (,).

Column 1, line 57:  After "pp", add a period (.).

Column 1, line 64:  After "example", add a comma (,).

Column 2, line 34:  Change "severly" to --severely--.

Column 2, line 39:  Change "mirometers" to --micrometers--.

Column 3, line 15:  Change "mean" to --means--.

Column 4, line 4:  Change "prefereably" to --preferably--.

Column 4, line 5:  Before "(15)", add a semi-colon (;).

UNITED STATES PATENT AND TRADEMARK OFFICE
CERTIFICATE OF CORRECTION

PATENT NO. : 4,948,253

DATED : August 14, 1990

INVENTOR(S) : JAMES F. BIEGEN

It is certified that error appears in the above-identified patent and that said Letters Patent is hereby corrected as shown below:

Column 4, line 15: Change "einstant" to --instant--.

Column 4, line 42: After "type", change "of" to --or--.

Column 5, line 5: Change "Reflectivites" to --Reflectivities--.

Column 6, line 24: After "consisting", add --of--.

Column 6, line 41: Change "photsensitive" to --photosensitive--.

Column 6, line 59: Change "traNsducer" to --transducer--.

Column 7, line 33: Amendment dated March 28, 1990. After "elimination of", delete colon (:) and add --the--.

Column 7, line 45: Change "illuminatin" to --illumination--.

Column 7, line 47: Change "entraneous" to --extraneous--.

Column 8, line 6: Change "sad" to --said--.

UNITED STATES PATENT AND TRADEMARK OFFICE
CERTIFICATE OF CORRECTION

PATENT NO. : 4,948,253
DATED : August 14, 1990
INVENTOR(S) : JAMES F. BIEGEN

It is certified that error appears in the above-identified patent and that said Letters Patent is hereby corrected as shown below:

Column 8, line 8: Change "aNd" to --and--.

Column 8, line 59: Change "spatiallY" to --spatially--.

Column 8, line 60: Change "Profiler" to --profiler--.

Column 9, line 9: After "coherent" of claim 10, add a period (.).

Column 10, line 7: Change "intereacted" to --interacted--.

Column 10, line 49: Change "linearLY" to --linearly--.

Column 10, line 55: Change "interferometrice" to --interferometric--.

Column 10, line 58: Change "intereference" to --interference--.

Signed and Sealed this

Seventeenth Day of November, 1992

Attest:

DOUGLAS B. COMER

*Attesting Officer*   *Acting Commissioner of Patents and Trademarks*